(12) United States Patent
Bagattini

(10) Patent No.: US 11,708,509 B2
(45) Date of Patent: Jul. 25, 2023

(54) PROCESS FOR APPLYING AN ANTI-FRAGMENTATION SYSTEM TO MANUFACTURED ARTICLES MADE OF NATURAL STONE OR CERAMIC AND RELATED MANUFACTURED ARTICLE MADE OF NATURAL STONE OR CERAMIC

(71) Applicant: BAGATTINI S.R.L., Zandobbio Bergamo (IT)

(72) Inventor: Guido Bagattini, Zandobbio Bergamo (IT)

(73) Assignee: BAGATTINI S.R.L., Zandobbio Bergamo (IT)

( * ) Notice: Subject to any disclaimer, the term of this patent is extended or adjusted under 35 U.S.C. 154(b) by 267 days.

(21) Appl. No.: 16/639,061

(22) PCT Filed: Sep. 18, 2017

(86) PCT No.: PCT/IT2017/000199
§ 371 (c)(1),
(2) Date: Feb. 13, 2020

(87) PCT Pub. No.: WO2019/053754
PCT Pub. Date: Mar. 21, 2019

(65) Prior Publication Data
US 2020/0208016 A1     Jul. 2, 2020

(51) Int. Cl.
*B32B 37/12* (2006.01)
*C09J 5/00* (2006.01)
*C09J 7/21* (2018.01)
*B32B 5/02* (2006.01)
*B32B 5/24* (2006.01)
(Continued)

(52) U.S. Cl.
CPC .......... *C09J 5/00* (2013.01); *B32B 5/028* (2013.01); *B32B 5/24* (2013.01); *B32B 7/12* (2013.01); *B32B 9/002* (2013.01); *B32B 9/005* (2013.01); *B32B 17/02* (2013.01); *B32B 37/12* (2013.01); *C09J 7/21* (2018.01); *B32B 37/10* (2013.01); *B32B 38/10* (2013.01); *B32B 2262/101* (2013.01); *B32B 2305/38* (2013.01); *B32B 2315/02* (2013.01); *B32B 2318/04* (2013.01); *B32B 2419/04* (2013.01); *B32B 2451/00* (2013.01)

(58) Field of Classification Search
CPC combination set(s) only.
See application file for complete search history.

(56) References Cited

U.S. PATENT DOCUMENTS

2017/0356130 A1 * 12/2017 Guyot .................. B32B 27/304

FOREIGN PATENT DOCUMENTS

WO    WO-2006093367 A1 *  9/2006  ............. B32B 17/02

* cited by examiner

*Primary Examiner* — Vishal I Patel
(74) *Attorney, Agent, or Firm* — J. Miguel Hernandez; James R. Gourley; Carstens, Allen & Gourley, LLP

(57) ABSTRACT

A process for applying an anti-fragmentation system to manufactured articles made of natural stone or ceramic, and a respective manufactured article equipped with such an anti-fragmentation system, which is provided with at least one retaining member having an adhesive surface, and a manufactured article in the form of a slab and having a first, visible surface with a respective ornamental appearance, and a second, non-visible surface opposite to said first surface; the retaining member is associated with the manufactured article by joining the adhesive surface to said second surface.

4 Claims, 3 Drawing Sheets

(51) Int. Cl.
    *B32B 7/12*        (2006.01)
    *B32B 9/00*        (2006.01)
    *B32B 17/02*      (2006.01)
    *B32B 37/10*      (2006.01)
    *B32B 38/10*      (2006.01)

PROCESS FOR APPLYING AN ANTI-FRAGMENTATION SYSTEM TO MANUFACTURED ARTICLES MADE OF NATURAL STONE OR CERAMIC AND RELATED MANUFACTURED ARTICLE MADE OF NATURAL STONE OR CERAMIC

CROSS-REFERENCE TO RELATED DISCLOSURE

This application is a U.S. National Stage of International Application No. PCT/IT2017/000199, filed on Sep. 18, 2017, and published as WO 2019/053754 on Mar. 21, 2019. Each application, publication, and patent listed in this paragraph are hereby incorporated by reference in their entireties.

TECHNICAL FIELD

The present invention relates to a process for applying an anti-fragmentation system to ornamental articles made of natural stone or ceramic. The present invention also relates to an anti-fragmentation system for manufactured articles made of natural stone or ceramic, and a coating article for structural and/or solely ornamental purposes, made of a ceramic material or of natural stone.

The present invention finds particular application with manufactured articles in the form of slabs and/or tiles of any size and, as described above, specifically made of stone, such as for example marble, ceramic.

The invention also finds application with products similar to those mentioned above, such as clinker, porcelain stoneware, resin or cement agglomerates, cement products, concrete products.

STATE OF THE ART

As is known, manufactured articles made of natural stone or ceramic, such as for example marble slabs or ceramic tiles, both used as a coating for any surface, are subject to fragmentation if damaged.

In fact, it should be noted that these manufactured articles, especially during transport, manufacturing or laying, may be hit or may fall, thus causing chipping and/or fragmentation of the same into many pieces.

This drawback occurs for the most part in the case of large articles, such as for example marble slabs, which during manufacturing can reach more than three metres in length for a maximum thickness of three centimetres.

In this context, the risk of bending or knocking the slab during transport and breaking it into many pieces is clearly high.

Ceramic materials, mostly used for making tiles, are also easily subject to fragmentation resulting from the extremely fragile nature of the material itself.

In this context, fragmentation of these manufactured articles is particularly problematic both in terms of personal safety and in terms of practicality of use and transport.

In fact, it should be noted that in the case of fragmentation, the single pieces of the product that detach can be very small and therefore difficult to detect.

From the point of view of personal safety, it should be considered that the single fragments of the product may fall on parts of the body of the operator who provides transport, manufacturing or laying.

In this context, it should also be considered that the fragments, especially in the case of stone slabs, can be large and heavy and for this reason could cause serious injury. In addition, splinters of the material can create sharp edges and therefore be very dangerous for the safety of the operator.

In order to overcome these drawbacks, processes designed to hold together the single fragments of the product are applied at least to stone slabs.

Such processes, also known by the term "matting", comprise applying a fabric layer onto the side of the workpiece that in use is not visible.

In particular, fibre meshes are used, such as, generally, glass fibre meshes, arranged on the non-visible side of the slab and subsequently glued thereto by means of an adhesive resin layer.

The resin, mostly an epoxy resin, is spread on the fibre mesh, which by absorbing said resin solidifies and stably bonds to the non-visible slab surface.

Solidification and gluing of the resin are finalized in appropriate furnaces and/or catalysts, which bring the article thus manufactured to high temperatures for a given length of time.

In this way, the single fragments of the manufactured article remain glued to the mesh that, by being flexible and particularly resistant, succeeds in retaining the aforementioned fragments of material, thus facilitating the removal thereof and preventing them from falling on the operator.

However, the known "matting" processes summarily described above, albeit capable of providing a structure that is able to retain the fragments of a manufactured article, have major drawbacks.

First, it should be considered that the process for applying and gluing the mesh is very long given the time required for application, heating, and drying or catalysing the epoxy resin. In addition, the slab exiting the furnace must still be cooled before it can be handled, with a further increase in production times.

Moreover, the entire process is laborious as it requires a number of operations to be performed on the slab, which are carried out manually or automatically.

Plants for automatically coating the fibre mesh with the resin and feeding, again automatically, the slabs in the heating furnaces are provided in the latter case.

However, these plants are very bulky due to the need to move slabs that can be large, and make them fit in the furnaces.

Automatic resin coating systems are also particularly complex and very costly due to the chemical nature of the resin itself that can be toxic, flammable and difficult to dispose of.

In this context, management of the epoxy resin involves implementation of plants for feeding, sucking up and storing the resin itself that are very costly and bulky.

It should also be noted that the "matting" processes described above are limited to only a few types of manufactured articles. In fact, for some materials, the heating step in the furnace can change some aesthetic and structural properties of said manufactured article.

OBJECT OF THE INVENTION

Therefore, the object of the present invention is to provide a process for applying an anti-fragmentation system to manufactured articles made of natural stone or ceramic, and a manufactured article made of natural stone or ceramic, which are able to solve the aforementioned problems.

In particular, a first object of the present invention is to provide a process for applying an anti-fragmentation system, which is simple and cost-effective.

A further object of the present invention is to provide a process, which can be performed without having to provide complex structures and plants that are particularly highly cumbersome and expensive to manage.

A still further object of the present invention is to provide a process, which is fast, does not require steps of heating and cooling the articles, and can be performed either manually or automatically.

Another object of the present invention is to provide an anti-fragmentation system, which is applicable to any type of manufactured article in the form of a slab or panel made of stone, ceramic, or other materials with substantially equivalent technical and morphological characteristics.

A still further object of the present invention is to provide a manufactured article made of natural stone or ceramic, equipped with an anti-fragmentation system, which is able to stably retain possible fragments of material or splinters resulting from damage to the article itself.

Lastly, an object of the present invention is to provide a manufactured article made of natural stone or ceramic, equipped with an anti-fragmentation system, which is structurally simple, light and cost-effective.

The specified technical task and objects are substantially achieved by means of a process for applying an anti-fragmentation system to manufactured articles made of natural stone or ceramic, and a manufactured article made of natural stone or ceramic, comprising the technical features set forth in one or more of the accompanying claims.

BRIEF DESCRIPTION OF THE DRAWINGS

Further features and advantages of the present invention will become more apparent from the indicative, and therefore non-limiting description of a preferred, but not exclusive, embodiment of a process for applying an anti-fragmentation system to manufactured articles made of natural stone or ceramic, and a manufactured article made of natural stone or ceramic, as illustrated in the accompanying drawings wherein.

DETAILED DESCRIPTION OF PREFERRED EMBODIMENTS OF THE INVENTION

Figure 1:
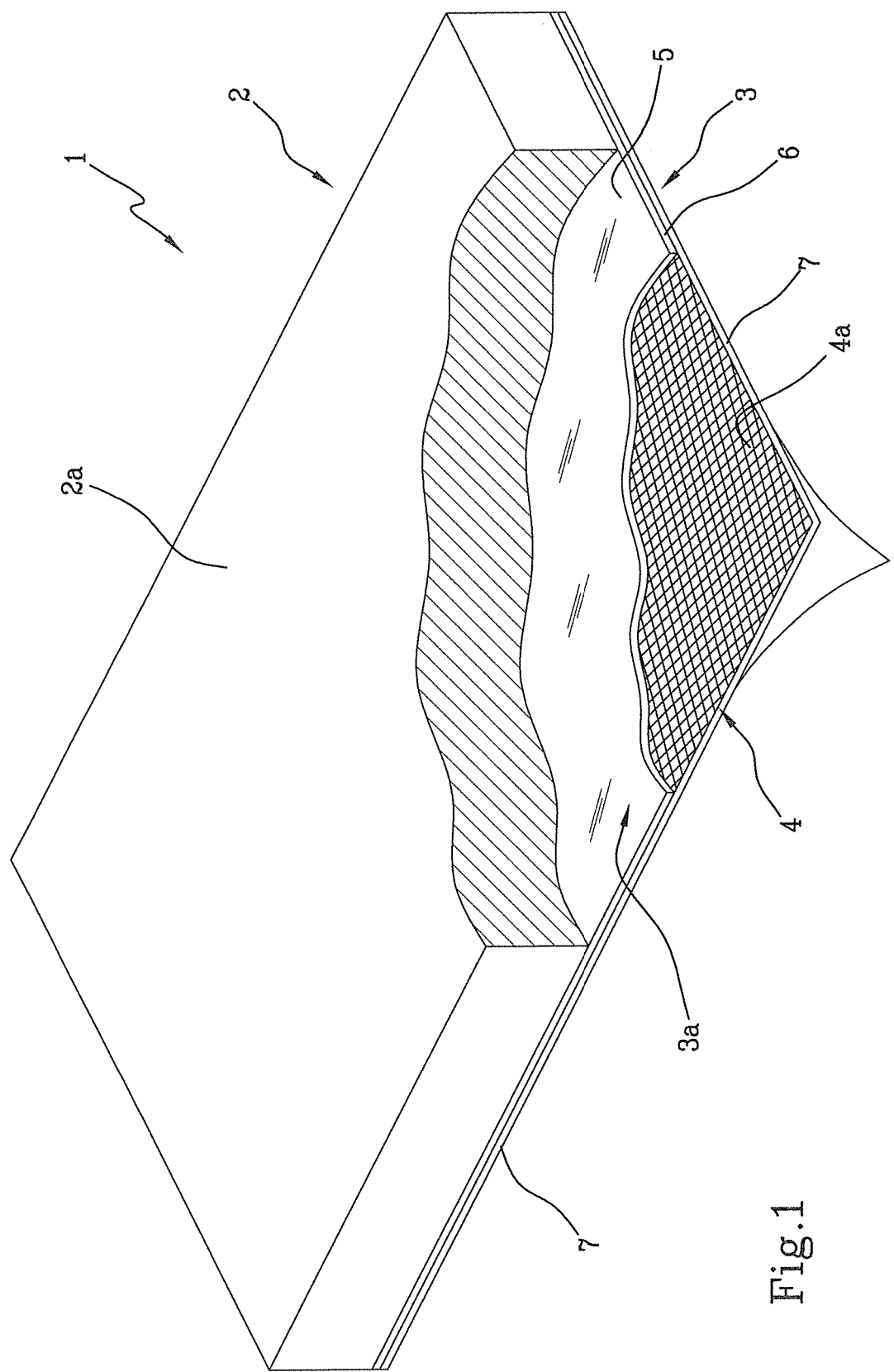
FIG. 1 shows a perspective and schematic view of a manufactured article in stone equipped with an anti-fragmentation system according to the present invention.

With reference to the attached figures, a manufactured article made of natural stone or ceramic in accordance with the present invention is indicated as a whole by the numeral 1.

It should first be noted that the present invention finds application with coating and/or ornamental articles made of any material having the same characteristics as stone or ceramic and in any geometric shape.

However, for purposes of greater clarity and in accordance with the advantages of the present invention, reference will be specifically made to manufactured articles made of natural stone or ceramic and in the form of a slab of any size.

In greater detail, the manufactured article 1 comprises at least one slab 2 having a first surface 2a, which, in use, is visible on the outside and has a respective ornamental appearance. A second surface 2b extends on the opposite side of the first surface 2a, the former, in use, being non-visible and usually anchored to a respective surface to be coated by known procedures.

As specified above, the slab 2 can have any peripheral extension and size. For example, the slab 2 may have the typical dimensions of a tile, in the case of ceramic materials, or a length up to 3.5 metres as in the case of marble slabs.

The manufactured article 1 further comprises at least one retaining member 3 provided with an adhesive surface 3a firmly engaged with the second, non-visible surface 2b of the slab 2.

In particular, as is better illustrated in the accompanying figures, the retaining member 3 constitutes the anti-fragmentation system for manufactured articles 1 made of natural stone or ceramic according to the present invention.

In this context, the retaining member comprises a fibre sheet 4 and a tackifying layer 5 arranged on at least one side of said sheet 4. The tackifying layer 5 defines the adhesive surface 3a that allows anchorage of the retaining member 3 to the slab 2.

Advantageously, the fibre sheet 4 comprises a net or mesh, preferably made of glass fibre or of a material with similar structural characteristics.

The tackifying layer 5, which is interposed between the slab 2 and the sheet 4, preferably comprises an adhesive film 6 with which the sheet 4 itself is associated.

Figure 2:
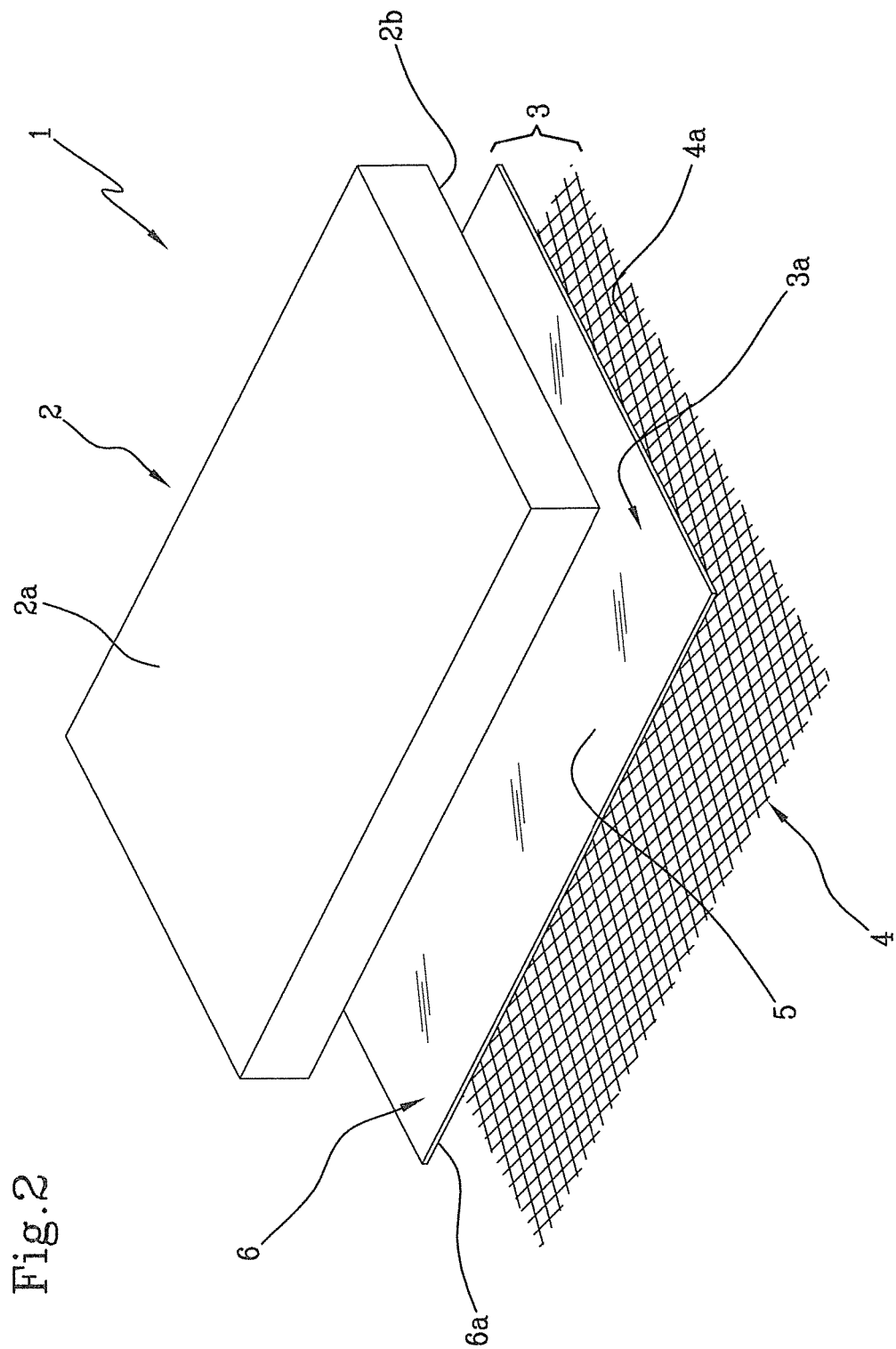
FIG. 2 shows a perspective and exploded view of the manufactured article of FIG. 1 according to a first embodiment in accordance with the present invention.

In accordance with a possible embodiment according to the present invention, the film 6 is of the double-sided type so as to be interposed between the slab 2 and the sheet 4, thereby defining a stable coupling (FIG. 2).

Figure 3:
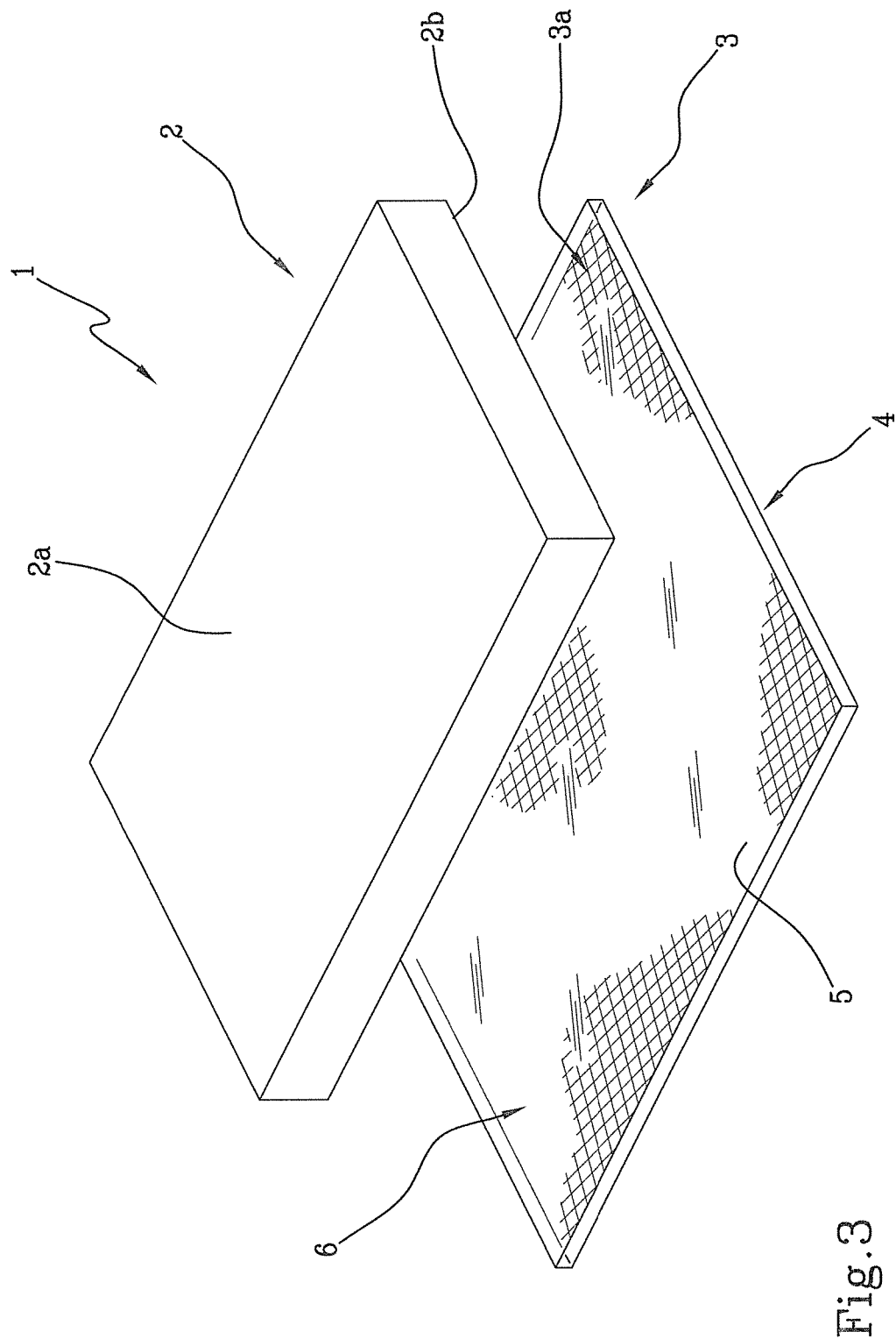
FIG. 3 shows a perspective and exploded view of the manufactured article of FIG. 1 according to a second embodiment in accordance with the present invention.

In accordance with other possible embodiments, the film 6 has only one adhesive side that is in contact with the second surface 2b of the slab 2. In this situation, the film 6 is a single body with the sheet 4 as it internally encloses said fibre material mesh (FIG. 3).

Again, in this embodiment, the film 6 can be provided alone without said sheet 4. In this case, the fibre sheet is not used, and the retaining member 3 is constituted by the film 6 alone, which is suitably sized so that it can retain the fragments of the slab 2.

In this case too, the film 6 can be of the double-sided type so as to be coupled to the slab 2 on one side, and on the opposite side so as to provide a wall or support, which is to be coated with the manufactured article 1, with a laying adhesive surface.

Preferably, the retaining member 3 uncoupled from the slab 2 is provided with a protective film (not shown in the accompanying figures) associated with the adhesive surface 3a and removable therefrom to allow coupling with a slab 2.

Still, the manufactured article 1 can be provided with a gripping layer 7 (FIG. 1) associated with the retaining member 3 on the opposite side of the respective adhesive surface 3a. The gripping layer 7 gives the possibility of bonding the manufactured article 1 to the supports used, i.e. plaster walls or any other surface to be coated with the manufactured articles 1 object of the present invention, in a simple and firm manner.

In accordance with the two embodiments described above, namely the bi-adhesive film 6 arrangement (FIG. 2) or the arrangement in which the film 6 is integrated with the sheet 4 (FIG. 3), in both cases the gripping layer 7 is constituted by a sheet element having at least one surface that can be glued to the retaining member 3 on the opposite side of the adhesive surface 3a.

In accordance with a first technical solution, the gripping layer 7 has an adhesive sheet on the side coupled to the retaining member, and a gripping sheet on the opposite side, so that it can provide for the laying of the manufactured article 1 and then be installed on supports or walls to be coated.

In accordance with a second technical solution, the gripping layer 7 can be constituted by a bi-adhesive sheet provided with a protective film on the outer side (the laying side). In this case, the protective film is removed to provide for the installation of the manufactured article 1 on supports or walls to be coated.

The present invention also relates to a process for applying the anti-fragmentation system to manufactured articles made of natural stone or ceramic.

The process comprises the preliminary steps of providing at least one retaining member 3 having the aforementioned adhesive surface 3a, and providing a manufactured article made in the form of a slab 2 having a first, visible surface 2a and a second, non-visible surface 2b opposite to the first surface 2a.

The step of providing at least one retaining member 3 is carried out by providing the above fibre mesh/net sheet 4 and applying a tackifying layer 5 to at least one side 4a of the sheet 4 in order to form said adhesive surface 3a.

In accordance with a first embodiment of the present invention illustrated in FIG. 2, the step of applying the tackifying layer 5 is implemented by providing a bi-adhesive film 6 and engaging a first side 6a of the film 6 with the side 4a of the sheet 4.

In accordance with a second embodiment of the invention illustrated in FIG. 3, the step of applying the tackifying layer 5 is implemented by providing a film 6 internally enclosing the fibre sheet 4. In this case, the film 6 and the sheet are made in one body.

The process further comprises the step of associating the above-described retaining member 3 with the manufactured article 1, i.e. with the slab 2, by joining the adhesive surface 3a to the second surface 2b of the slab 2.

In particular, the step of associating the retaining member 3 with the manufactured article 1 is carried out by spreading the fibre sheet 4 over the entire second surface 2b of the slab 2 so as to maintain the respective adhesive surface 3a abutted against said second surface 2b.

This operation may be performed manually by an operator or automatically by means of suitable rollers, which unwind and feed the retaining member 3 over the second surface 2b of the slab 2.

In this case, the feeding and application of the retaining member 3 over the slab 2 is implemented continuously over the whole planar extension of the second surface 2b of each slab 2.

In addition, prior to the step of associating the retaining member 3 with the manufactured article 1, an additional step of removing the protective film (if any) from the tackifying layer 5 is performed, in order to activate the adhesive surface 3a of the retaining member 3 and define a stable coupling between said member 3 and the slab 2.

Advantageously, the step of associating the retaining member 3 with the manufactured article 1 further comprises, subsequent to the step of spreading the sheet 4 on the second surface 2b of the slab 2, the substep of pressing the sheet 4 against the manufactured article 1 so as to define a stable coupling of the retaining member 3 to said manufactured article 1.

In fact, to ensure that the entire adhesive surface 3a is glued in a homogeneous and efficient manner, the above-mentioned pressing step is carried out, which step can be implemented by known pressing systems, such as for instance feed rollers or calenders suitably sized for the intended purpose.

Advantageously, the above-described process solves the problems of the prior art and provides numerous advantages.

Firstly, the entire process of application of the anti-fragmentation system is very fast and easy to implement because it only entails the coupling of the retaining member 3 to the stone or ceramic article.

As a result, spreading and heating/cooling operations in furnaces are not required, with consequent advantages in terms of rate of application, operational simplicity and therefore total production costs.

This simplicity also entails advantages in terms of versatility of the application system, which can be performed either manually, by gluing the member 3, or automatically with the above-mentioned unwinding rollers.

Advantageously, any plant for the application of the anti-fragmentation system would also be very simple, limited in size and cost as it would not require furnaces, coating systems and management of epoxy resins. On the contrary, the plant for the application of the anti-fragmentation system according to the present invention would only consist of rollers or similar devices for feeding and pressing the fibre sheet 4 bonded to the respective slab 2.

In this respect, it should also be considered that the exclusion of the resin for stably engaging the sheet 4 with the slab 2 entails considerable advantages related to the management of the resin itself, in that systems suitable for suction and storage of the resin are not required.

In addition, a further major advantage of the present invention is due to easy implementation of the single retaining member 3, which is provided simply by joining the fibre mesh 4 to the film 6 that can be a bi-adhesive film.

This structure ensures stable retention of the fragments of the slab in case of possible damage to the same.

Moreover, the present invention is applicable to any type of manufactured article 1 in the form of a slab 2 without any limit in size or type of material.

This advantage is again due to the constructional simplicity of the retaining member 3 that, by being adhesive, is easily applicable, even manually, to any surface.

Furthermore, the process object of the present invention does not change the aesthetic and structural characteristics of the manufactured article 1, given the absence of additional treatments to the manufactured article 1 itself, which are instead implemented in the prior art, such as for example the heating in furnaces.

The invention claimed is:

1. A process for applying an anti-fragmentation system to manufactured articles made of natural stone or ceramic comprising the steps of:

providing at least one retaining member having an adhesive surface; said step of providing at least one retaining member comprises a substep of providing a fibre sheet and applying a tackifying layer to at least one side of said sheet in order to form said adhesive surface;

providing a manufactured article made in the form of a slab and having a first, visible surface with a respective ornamental appearance, and a second, non-visible surface opposite to said first surface; and associating the retaining member with the manufactured article by joining the adhesive surface to said second surface;

wherein said step of applying a tackifying layer is implemented by providing a bi-adhesive film and engaging one side of said film with the side of said sheet;

and wherein further comprises the step of associating a gripping layer with the retaining member on the opposite side of the respective adhesive surface, the gripping layer having an adhesive sheet on the side coupled to the retaining member and a gripping sheet on the opposite side.

2. The process according to claim 1, characterised in that said step of associating the retaining member with the manufactured article comprises a substep of spreading the fibre sheet over the entire second surface of the slab so as to abut the respective adhesive surface against said second surface.

3. The process according to claim 2, characterised in that said step of associating the retaining member with the manufactured article further comprises, subsequent to the step of spreading the sheet on the second surface, a substep of pressing the sheet against the manufactured article so as to define a stable coupling of the retaining member to said manufactured article.

4. A process according to claim 1, characterised in that it further comprises, prior to the step of associating the retaining member with the manufactured article, a step of removing a protective film from said tackifying layer of the sheet to define said adhesive surface of the retaining member.

* * * * *